(12) United States Patent
Runzel, IV et al.

(10) Patent No.: US 9,165,698 B2
(45) Date of Patent: Oct. 20, 2015

(54) CABLE ASSEMBLY AND METHOD OF MAKING A CABLE ASSEMBLY

(75) Inventors: William Runzel, IV, Evanston, IL (US); Emile Tohme, Oak Park, IL (US); Eric Fitz, Glenview, IL (US); Stephen Schultz, Lockport, IL (US)

(73) Assignee: Lake Cable, LLC, Bensenville, IL (US)

( * ) Notice: Subject to any disclaimer, the term of this patent is extended or adjusted under 35 U.S.C. 154(b) by 1147 days.

(21) Appl. No.: 13/033,888

(22) Filed: Feb. 24, 2011

(65) Prior Publication Data

US 2012/0217061 A1    Aug. 30, 2012

(51) Int. Cl.
| | |
|---|---|
| *H02G 15/00* | (2006.01) |
| *H01B 7/00* | (2006.01) |
| *H01B 13/00* | (2006.01) |
| *H01B 11/22* | (2006.01) |

(52) U.S. Cl.
CPC ............. *H01B 7/009* (2013.01); *H01B 11/22* (2013.01); *H01B 13/0023* (2013.01)

(58) Field of Classification Search
CPC ........... B29L 2031/3462; B29C 65/48; B29C 65/4895; H01B 13/0023; H01B 7/0876; H01B 11/22; H01B 11/20
USPC ............ 156/47, 60; 174/34, 113 C, 128.2, 27
See application file for complete search history.

(56) References Cited

U.S. PATENT DOCUMENTS

| | | | |
|---|---|---|---|
| 2,204,782 | A | 6/1940 | Wermine |
| 2,828,234 | A | 3/1958 | Hengel et al. |
| 3,440,118 | A | 4/1969 | Obeda |
| 3,833,755 | A | 9/1974 | Soelberg |
| 4,034,148 | A | 7/1977 | Lang |
| 4,165,559 | A | 8/1979 | Lang et al. |
| 4,356,345 | A | 10/1982 | Gonia |
| 4,381,208 | A | 4/1983 | Baverstock |
| 4,486,253 | A | 12/1984 | Gonia |
| 4,837,405 | A | 6/1989 | Bonjour et al. |
| 5,245,134 | A | 9/1993 | Vana, Jr. et al. |
| 5,592,739 | A | 1/1997 | Ferrill et al. |
| 5,606,151 | A | 2/1997 | Siekierka et al. |
| 6,273,977 | B1 | 8/2001 | Harden et al. |
| 6,370,303 | B1 | 4/2002 | Fitz et al. |
| 6,841,729 | B2 | 1/2005 | Sakabe et al. |
| 6,847,767 | B2 | 1/2005 | Hurley et al. |
| 7,049,523 | B2 | 5/2006 | Shuman et al. |
| 7,272,284 | B1 | 9/2007 | Pluister |
| 7,358,436 | B2 | 4/2008 | Dellagala et al. |
| 7,495,175 | B2 | 2/2009 | Pluister |

*Primary Examiner* — Daniel Lee
*Assistant Examiner* — Margaret Squalls
(74) *Attorney, Agent, or Firm* — Wood, Phillips, Katz, Clark & Mortimer

(57) ABSTRACT

A cable assembly having a first cable component with a length and at least a first conductive element extending in a lengthwise direction, and a second cable component with a length and at least a second conductive element extending in the lengthwise direction. The first and second cable components are separately pre-formed and thereafter releasably bonded together through a separately applied composition at discrete locations between the first and second cable components at spaced intervals along the lengths of the first and second cable components. The first and second cable components are capable of being drawn, one away from the other, to selectively break the bond between the first and second cable components at at least one of the discrete locations to thereby separate the first and second cable components.

23 Claims, 6 Drawing Sheets

CABLE ASSEMBLY AND METHOD OF MAKING A CABLE ASSEMBLY

BACKGROUND OF THE INVENTION

1. Field of the Invention

This invention relates to cable assemblies consisting of strategically joined cable components. The invention is also directed to a method of making the cable assembly.

2. Background Art

A multitude of cable assemblies currently exists to transmit a wide range of signals, among which are data, power, voice, etc. These cable assemblies are made up of a plurality of individual cable components, with each separate component typically having one or more conductive elements and/or optical fibers, potentially together with other non-signal conducting elements, encased by a surrounding jacket.

In one basic form, the individual cable components are combined and in turn surrounded by an outer jacket that maintains the individual cable components together to produce an overall consistent cross-sectional shape for the cable assembly. The cable assembly is commonly coiled or wrapped around spools for bulk storage.

The nature of the individual cable components is dictated by the particular application. The cable components may be the same or different. On a particular job all, or potentially less than all, of the cable components may be utilized.

The utilized cable components may terminate at the same location. Alternatively, one or more of the cable components may be branched mid-length to be diverted to a different location.

With the above construction, installers are required to strategically remove portions of the outer jacket to access the desired cable component(s) to effect connection thereof.

The outer jackets may be somewhat durable in nature, thereby potentially requiring a significant effort to remove the same on a particular site. Often, to effect removal of the outer jacket, the outer jacket may be scored or cut through with a sharpened instrument. In so doing, there exists a significant risk that one or more of the jackets on a cable component might be compromised, which could lead to shorting, signal interruption or compromise, introduction of moisture to against a conductive or optical fiber element, etc. This is particularly a problem when the outer jacket is removed at a mid-length location.

The use of the outer jacket has other drawbacks. A significant amount of material may be required to produce the jacket, when ultimately a substantial portion thereof will be removed at the installation site. The inclusion of a jacket also adds significantly to the weight of the cable assembly, which may be packed in lengths that cause the outer jacket to detrimentally add to shipping costs and make handling, between point of manufacture and installation site, more difficult. Further, the removed outer jacket becomes scrap that must be disposed of. While on small jobs this may not be significant, when installations require use of many miles of the cable assembly, the accumulation of scrap becomes significant and has ecological ramifications.

It is known to adhere multiple cable components together without requiring an outer jacket. One conventional method of doing so is shown in U.S. Pat. No. 7,049,523.

In U.S. Pat. No. 7,049,523, a bonding layer is formed continuously over the length of the cable assembly and adhered to each of the wire components. The installer can "peel" the desired length of cable component(s) away from the bonding layer and thus the remaining cable component(s).

While the above system does obviate many of the problems associated with an outer jacket, it introduces additional problems. First of all, the use of the bonding component over the entire running length of the cable assembly adds undesirably to both the weight and manufacturing cost thereof.

Still further, after the cable component(s) is peeled from the remaining component(s), the bonding component remains intact. In some situations, the bonding component may interfere with routing of a particular cable component or cable components to which it remains attached.

The cable manufacturing industry continues to be increasingly more competitive. The ultimate objectives of product designers include, among others, ease of use, weight control, and affordability. With existing designs, these objectives often compete, as a result of which there may be significant limitations with a particular design. The industry continues to seek out new designs in a market that functions with ever-decreasing margins.

SUMMARY OF THE INVENTION

In one form, the invention is directed to a cable assembly with: a first cable component having a length and including at least a first conductive element extending in a lengthwise direction; and a second cable component having a length and including at least a second conductive element extending in a lengthwise direction. The first and second cable components are separately pre-formed and thereafter releasably bonded together through a separately applied composition at discrete locations between the first and second cable components at spaced intervals along the lengths of the first and second cable components. The first and second cable components are capable of being drawn, one away from the other, to selectively break a bond between the first and second cable components at at least one of the discrete locations to thereby separate the first and second cable components to thereby allow use of a desired length of one of the first and second cable components spaced from the other of the first and second cable components.

In one form, the first and second cable components are bonded by using an adhesive as the composition that bonds separately to each of the first and second cable components.

In one form, the first and second cable components are bonded by using a solvent as the composition that causes the first and second cable components to be bonded by being fused with each other.

In one form, the first cable component has a first jacket formed around the at least first conductive element, the second cable component has a second jacket formed around the at least second conductive element, and the solvent melts the first and second jackets to cause the first and second cable components to be bonded by being fused with each other.

In one form, the first cable component has a first jacket formed around the at least first conductive element, the second cable component has a second jacket formed around the at least second conductive element, and the adhesive is formed as a layer between the first and second jackets that bonds separately to each of the first and second jackets.

In one form, the first and second jackets and adhesive are made from the same material.

In one form, the cable assembly has a length and the first and second cable components are bonded together at the discrete locations that are spaced at regular intervals along the length of the cable assembly.

In one form, the discrete locations are spaced lengthwise of the cable assembly distances from 2-8 inches.

In one form, the first and second cable components are bonded at the discrete locations over distances of 2-8 inches along the length of the cable assembly.

In one form, the cable assembly further includes a third cable component having a length and at least a third conductive element extending in a lengthwise direction. The first, second, and third cable components are releasably bonded together at the discrete locations.

In one form, the composition is an adhesive layer, that resides between and bonds directly to, each of the first, second, and third cable components.

In one form, the cable assembly further includes a fourth cable component having a length and at least a fourth conductive element extending in a lengthwise direction. The first cable component is not directly bonded to at least one other of the second, third, and fourth cable components.

In one form, the first and second cable components are twisted together about their lengths.

In one form, the bond between the first and second cable components is broken by drawing the one of the first and second cable components away from the other of the first and second cable components with a force between 2-6 pounds.

In one form, the solvent is tetrahydrofuron (THF).

In one form, the first and second jackets are at least one of polyethylene (PE) and polyvinyl chloride (PVC).

In one form, the adhesive is applied in a hot melt form to the first and second cable components.

In one form, the cable assembly has a length and a nominally cylindrical shape transverse to the length of the cable assembly.

In one form, the first and second cable components each has a central axis and the first and second cable components are bonded at locations on the first and second cable components where a line extending through the central axes coincides with the first and second cable components.

The invention is further directed to a method of forming a cable assembly. The method includes the steps of: pre-forming a first cable component having a length and including at least a first conductive element extending in a lengthwise direction; pre-forming a second cable component having a length and including at least a second conductive component extending in a lengthwise direction; and applying a bonding composition to the pre-formed first and second cable components at discrete locations at controlled, spaced intervals along the lengths of the first and second cable components to thereby maintain the first and second cable components together with a bonding force that can be overcome by drawing one of the first and second cable components away from the other of the first and second cable components with a force having a component that is transverse to the length of the first and second cable components.

In one form, the bonding force can be overcome by drawing the one of the first and second wire components away from the other of the first and second components with a force of from 2-6 pounds.

DETAILED DESCRIPTION OF THE PREFERRED EMBODIMENT

Figure 1:
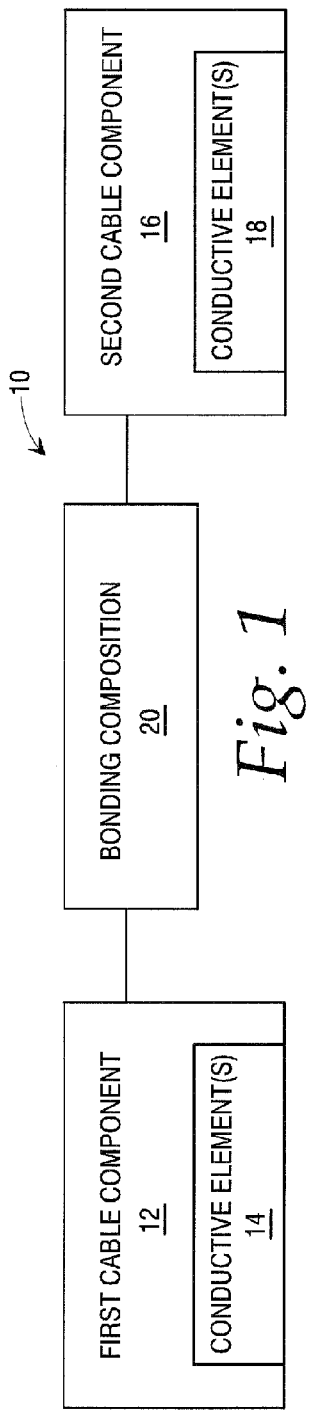
FIG. 1 is a schematic representation of one form of cable assembly, according to the present invention, and consisting of first and second cable components bonded through a composition.

In FIG. 1, a cable assembly, according to the present invention, is shown at 10. The cable assembly 10 consists of: a) a first cable component 12 with a length and having at least a first conductive element 14, or optical fiber, extending in a lengthwise direction; and b) a second cable component 16 with a length and having at least a second conductive, or optical fiber, element 18 extending in a lengthwise direction. For purposes of simplicity, "conductive element", as used in the detailed description and claims herein, will identify and encompass any element capable of transmitting any type of signal in a cable configuration. Included in, but not exhaustive of, this category are metallic and optical fiber elements. The first and second cable components 12, 16 are separately preformed and thereafter releasably maintained together using a bonding composition 20 applied at discrete locations between the first and second cable components 12, 16 at spaced intervals along the lengths of the first and second cable components 12, 16.

The first and second cable components 12, 16 are capable of being drawn, one away from the other, to selectively break the bond between the first and second cable components 12, 16 at a selected one or more of the discrete locations to thereby separate the first and second cable components 12, 16 from each other. The number of discrete locations at which the bond is broken dictates the separated lengths of the wire components 12, 16, thereby allowing use of a desired length of one of the first and second cable components 12, 16 apart from the other of the first and second cable components 12, 16.

The first and second cable components 12, 16 and bonding composition 20 are shown in FIG. 1 in schematic form to encompass virtually a limitless number of different structures/compositions. The precise nature of the first and second cable components 12, 16 is not critical to the present invention.

It is contemplated that within the generic showing in FIG. 1 that the first and second cable components 12, 16 may be any component typically utilized for data, power, telephone, audio, light, cable, etc. transmission, regardless of the particular application. Typically, the conductive elements 14, 18 are relatively small in gauge, residing within the range of 10-24, though this should not be viewed as limiting. The conductors may be optical fibers and/or metallic components that are solid or made up of twisted strands.

Essentially, the cable assembly 10, as depicted, is intended to encompass any type of cable assembly 10 that is conventionally stored on spools or in coils and which can be installed in any manner that any other type of flexible signal conveying component can be installed. The installation may be underground, above ground, internal to an edifice, and/or external thereto.

The installation may be such that all of the individual conductive elements 14, 18 are utilized. Alternatively, only some of the conductive elements 14, 18 may be utilized. The conductive elements 14, 18 may be terminated at the same location or diverted to different locations anywhere along the length of the cable assembly 10.

Generally, the composition of the cable assembly 10 will be such that it can be uncoiled or otherwise paid out from a bulk supply thereof by an installer at an installation site. As explained in greater detail below, the cable components 12, 16 may be pulled apart to effect the desired termination thereof without any great effort or inconvenience on the part of the installer.

While it is conceivable that each of the cable components 12, 16 may be made from a single conductive element, in most applications, each of the cable components 12, 16 will be made incorporating a plurality of conductive elements with the same or different signal transmitting capabilities. The number of cable components combined may be as few as two and unlimited in terms of numbers beyond two.

Figure 2:
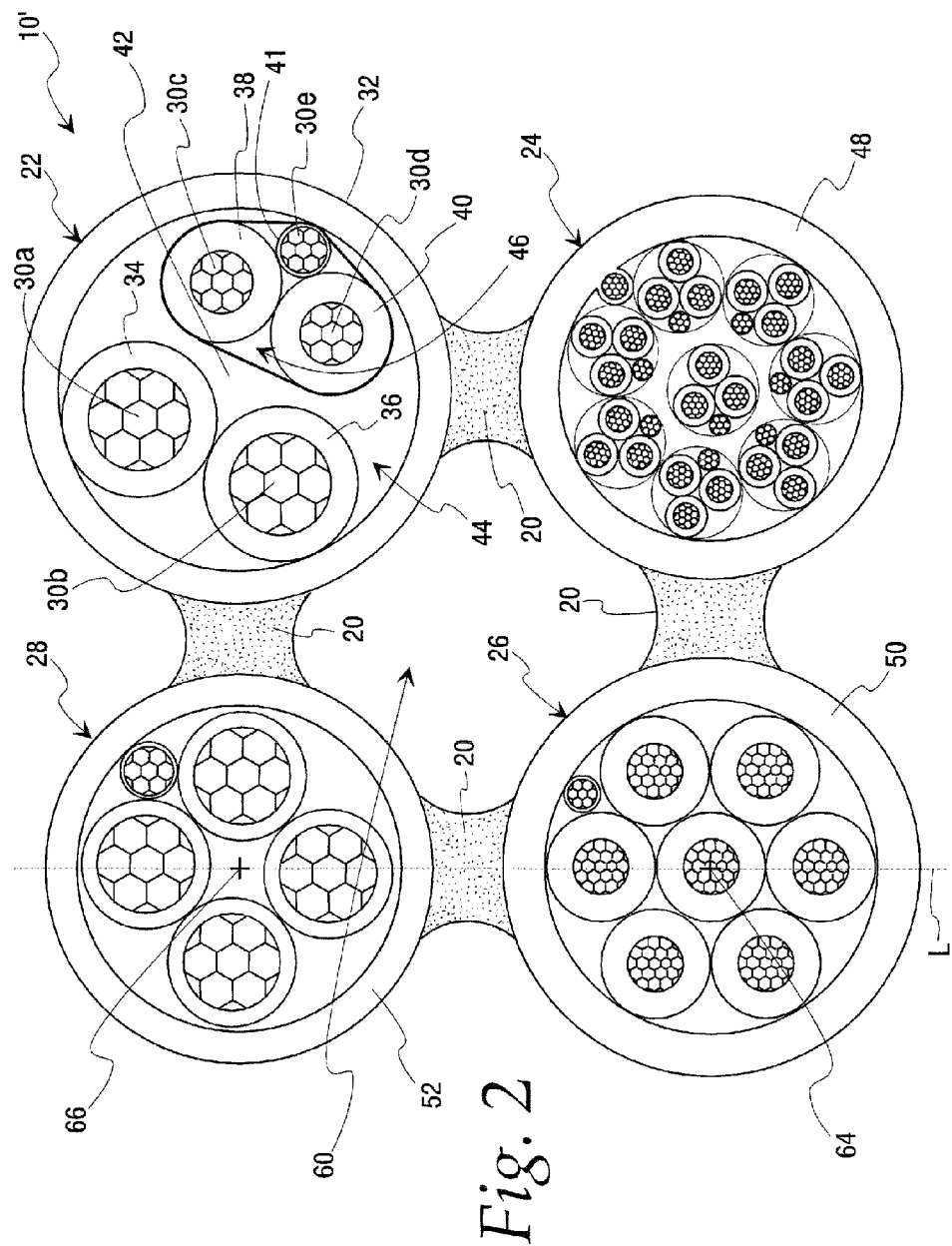
FIG. 2 is a cross-sectional view of one specific form of cable assembly, as shown in FIG. 1, and including four cable components bonded in a first manner.
Figure 4:
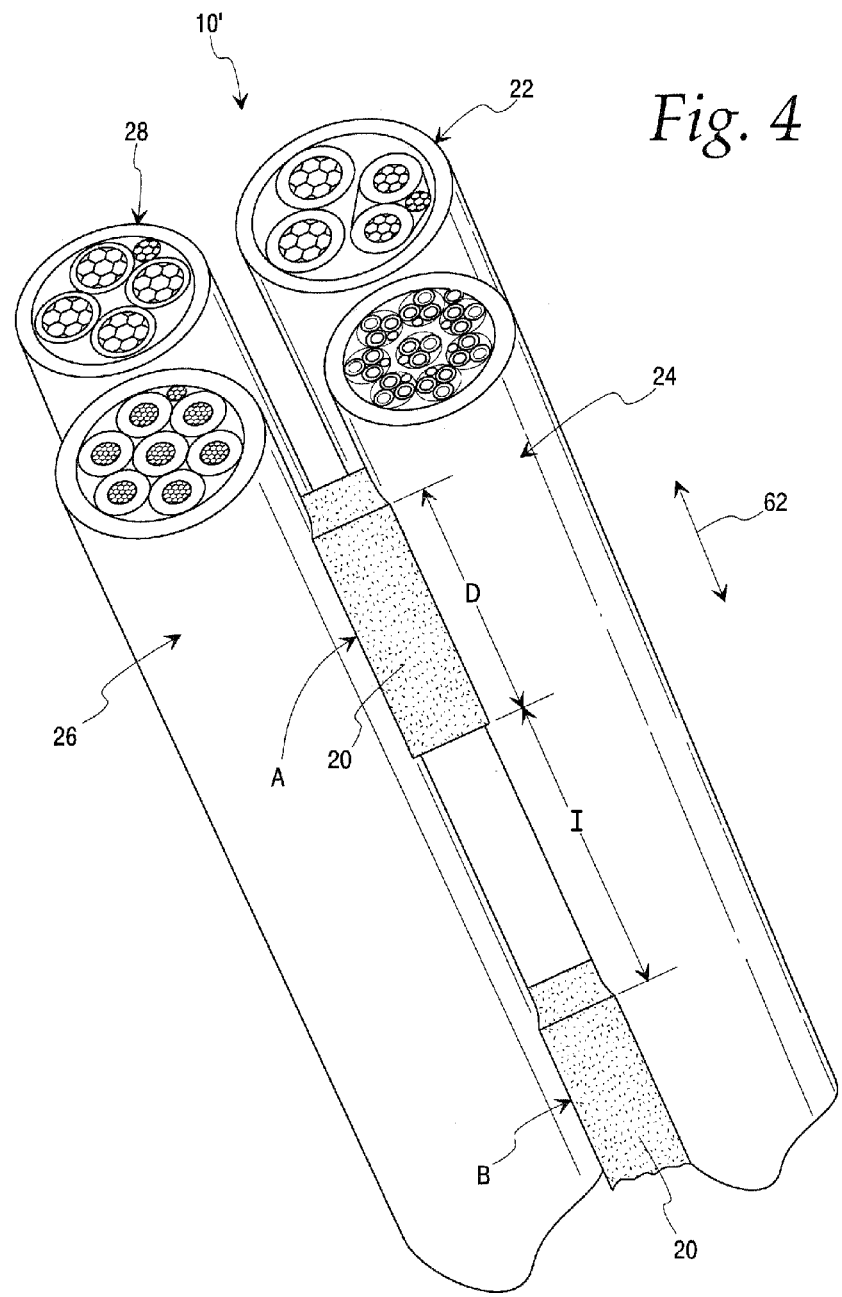
FIG. 4 is a reduced, fragmentary, perspective view of the cable assembly in FIG. 2.

In FIGS. 2 and 4, a cable assembly 10' is shown incorporating four separate cable components 22, 24, 26, 28, corresponding to the cable components 12, 16 shown in FIG. 1.

The cable component 22 has five separate conductive elements 30a, 30b, 30c, 30d, 30e. The conductive elements 30a-30e reside within an outer jacket 32. The conductive elements 30a, 30b respectively have their own outer jackets 34, 36. The conductive elements 30c, 30d respectively have their own outer jackets 38, 40, with the conductive element 30e having a jacket 41. The conductive elements 30c, 30d, 30e are surrounded by a separate jacket 42.

A space 44 within the outer jacket 32 and around the jackets 34, 36, 42 may include conventional filler/insulation, as may the space 46 within the jacket 42.

It is unnecessary to go through a detailed description of the construction of the remaining cable components 24, 26, 28 in FIG. 2, as one skilled in the art would easily understand the same from the drawings. Each of the cable components 24, 26, 28 has an outer jacket 48, 50, 52, successively, though this is not a requirement to maintain the integrity of all conductive elements therewithin.

Figure 3:
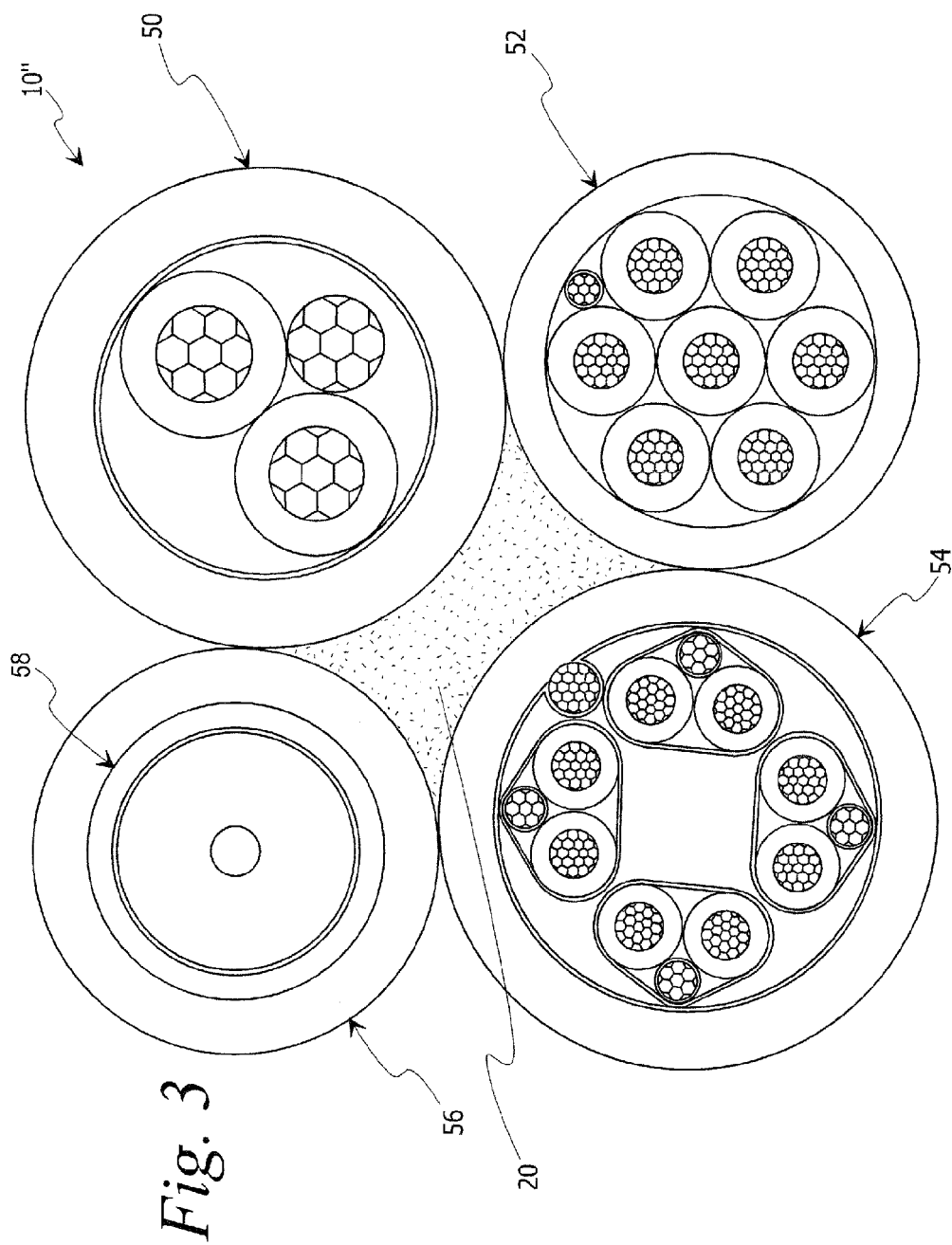
FIG. 3 is a view as in FIG. 2 of four different cable components bonded in a different manner than in FIG. 2 to produce a cable assembly.
Figure 5:
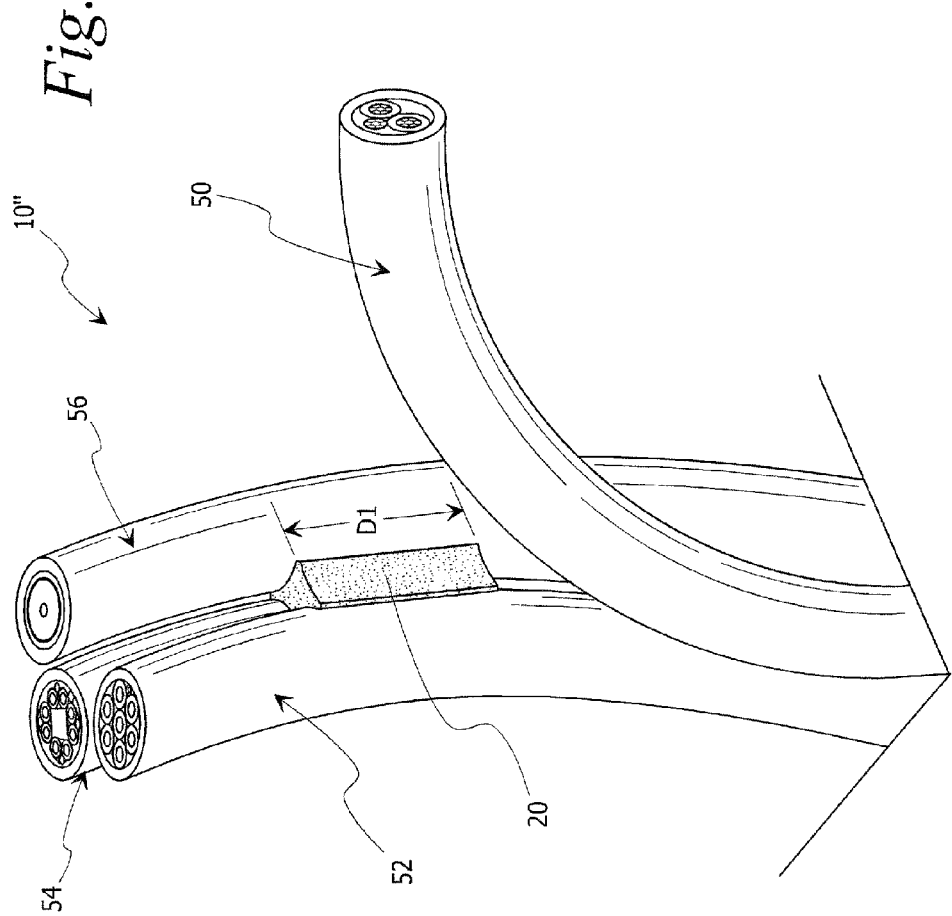
FIG. 5 is a reduced, perspective view of the cable assembly in FIG. 3 and showing a length of one of the cable components separated from the remaining cable components.

In FIGS. 3 and 5, a cable assembly 10" is shown, with four different cable components 50, 52, 54, 56 corresponding to the cable components 12, 16 shown in FIG. 1. Again, the details of the construction of the cable components 50, 52, 54, 56 would be understandable to someone skilled in the art, based upon the drawing. The cable assembly 10" incorporates in the cable component 56 a conductive element 58 in the form of a coaxial cable.

In FIGS. 2 and 4, the cable components 22, 24, 26, 28 are combined in a first manner to produce the cable assembly 10'. In this embodiment, the bonding composition 20 is applied as an adhesive at discrete locations at A and B spaced from each other at an interval I. This pattern is repeated throughout the entire length of the cable assembly 10'. As seen in FIG. 2, the bonding composition 20 resides as a layer between, and adheres to, each of: a) the cable components 22, 24; b) the cable components 22, 28; c) the cable components 26, 28; and d) the cable components 24, 26. The bonding composition 20 does not reside as a layer directly between: a) the cable components 24, 28; or b) the cable components 22, 26.

The resulting bonding arrangement produces a center core/gap 60. At the bonding locations, the cable components 22, 24, 26, 28 do not directly contact each other anywhere, including at the core/gap 60. Thus, the bonding composition 20 defines a spacing layer between the jackets on the cable components 22, 24, 26, 28 between which it directly resides and thereby maintains the cable components 22, 24, 26, 28 together by separately bonding to the jackets between which it directly resides.

With the cable components 22, 24, 26, 28 bonded together, the cable assembly 10' has an overall length, as indicated by the double-headed arrow 62 in FIG. 4. The intervals I, between the discrete locations A, B, at which the bonding composition is applied, are on the order of 2-8 inches along the length of the cable assembly 10'. While preferred, it is not required that all intervals I be the same.

The lengthwise extent of the application of the bonding composition 20, at each discrete location at which it is applied, is indicated by the dimension D in FIG. 4 and is preferably on the order of 2-8 inches along the length of the cable assembly 10'.

While the cable components 22, 24, 26, 28 could be bonded together in a straight configuration, more preferably, they are twisted together about their lengths to produce the cable assembly 10'. The process for applying the bonding composition 20 and twisting the cable components 22, 24, 26, 28 will be described in greater detail below.

As seen in FIG. 2, the bonding location for exemplary cable components 26, 28 is on the jackets 50, 52 where a line L extending through the central axes 64, 66 on the cable components 26, 28 intersects. A similar arrangement is provided for each of the cable components 22, 24, 26, 28 between which bonding is directly effected through the composition/adhesive 20.

In an alternative construction, as shown for the cable assembly 10" in FIGS. 3 and 5, the bonding composition/adhesive 20 is applied as a contiguous mass centrally of the bundled cable components 50, 52, 54, 56 so that each of the cable components 50, 52, 54, 56 engages the mass and thereby bonds directly to each of the other cable components 50, 52, 54, 56. With this arrangement, the composition/adhesive 20 does not form a spacing layer between any of the cable components 50, 52, 54, 56 so that they abut directly to each other. The overall diameter of the wire assembly 10" is thus minimized. While this compact construction is preferred, some, or all, of the cable components 50, 52, 54, 56 bonded to the mass of composition/adhesive 20 could be spaced from each other.

The lengthwise adhering distance D1 corresponds to that D for the cable assembly 10', i.e., is preferably on the order of 2-8 inches. Similarly, the lengthwise interval between the discrete locations at which the bonding composition/adhesive 20 is applied corresponds to that (I) for the cable assembly 10', i.e., is on the order of 2-8 inches.

With the cable assembly 10", the cable components 50, 52, 54, 56 may be straight. More preferably, the cable components 50, 52, 54, 56 are bundled together and twisted, as hereinafter described.

Each of the cable assemblies 10', 10" is preferably twisted in a manner to have a substantially cylindrical shape, that is circular as viewed in cross-section taken transversely to the length of the cable assemblies 10', 10". That is, the combined cable assemblies are substantially circular from this perspective as opposed to making up a flat construction which would result from joining straight lengths of the two cable assemblies 10', 10".

In one preferred form, the bonding composition 20 is made from the same material as the jackets on the cable components. As an example, the jackets may be made from at least one of polyethylene (PE) and polyvinyl chloride (PVC). As explained in greater detail below, the bonding composition 20 is preferably applied in hot melt form to the pre-formed cable components, though this is not required.

Figure 6:
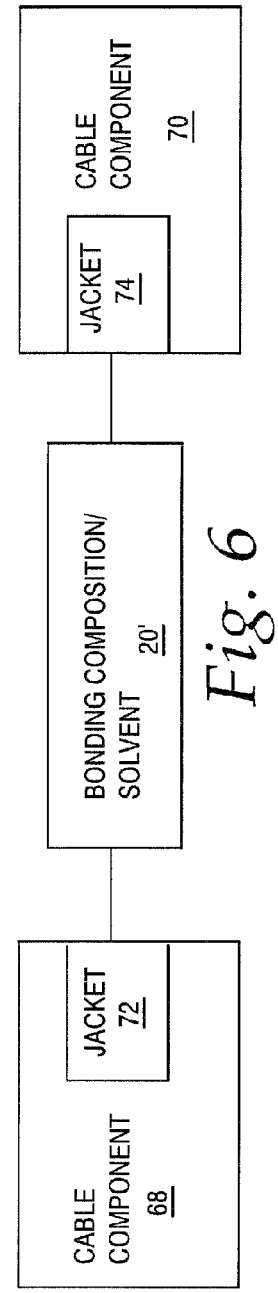
FIG. 6 is a schematic representation of a cable assembly, as in FIG. 1, wherein the bonding composition is in the form of a solvent.

As an alternative to the bonding component 20 being in the form of an adhesive, a bonding component, in the form of a solvent, shown at 20' in FIG. 6, may be used to bond separate cable components 68, 70 by direct fusion. The bonding composition/solvent 20' melts the jackets 72, 74, respectively associated with the cable components 68, 70, to thereby cause the cable components 68, 70 to fuse/bond directly to each other. This fusion bonding likewise minimizes the diameter of the resulting wire assembly.

The cable components 68, 70 may be combined with one or more additional cable components in arrangements as shown for the cable assemblies 10, 10', 10", with the only difference being that the cable components 68, 70 intimately bond as opposed to providing a composition that forms a spacing layer that separately bonds to each of the jackets between which it is placed.

Regardless of the nature of the bonding composition, or the manner of bonding, it is preferred that the bond between the cable components be capable of being broken by drawing one of the cooperating cable components away from the other cooperating component(s) with a force on the order of two pounds. Ideally, the "peeling" force required does not exceed six pounds. With this force application, there is a component that is adequate to effect the separate of the cable components.

Figure 7:
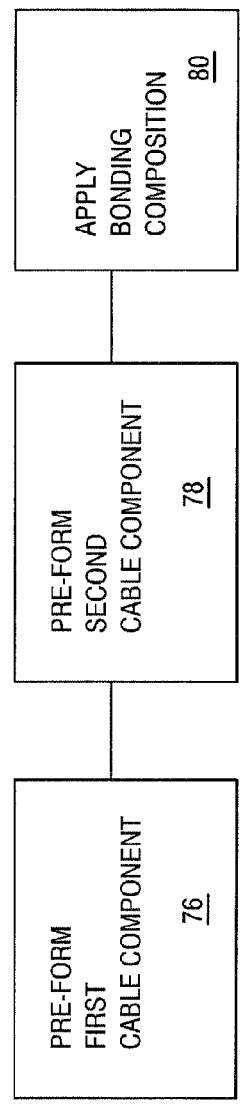
FIG. 7 is a flow diagram representation of a method of forming a cable assembly, according to the invention.

As shown in FIG. 7, the invention also contemplates a method of forming a cable assembly. As shown at block 76, a first cable component is pre-formed. The first cable component has a length and at least a first conductive element extending in a lengthwise direction.

As shown at block 78, a second cable component is pre-formed. The second cable component has a length and is made up of at least a second conductive component extending in a lengthwise direction.

As shown at block 80, a bonding composition is applied to the pre-formed first and second cable components at discrete locations at controlled, spaced intervals along the lengths of the first and second cable components. This maintains the first and second cable components together with a bonding force that can be overcome by drawing one of the first and second cable components away from the other of the first and second cable components with a force that has a component that is transverse to the length of the first and second cable components.

With the inventive structure, the end user/installer is afforded the convenience of separating the cable components without exerting him/herself. That is, the bonding composition maintains the cable components together in a completed form so that a length of cable with the bonded components can be reconfigured as by being coiled, wrapped, etc. and transported as a single continuous cable assembly. At the installation site, the installer can draw the cable component(s) that is desired to effect separation thereof. Since the bond is not continuous along the length of the cable assembly, the bond can be easily broken at the discrete locations with the cable components remaining unbonded between the locations at which the bonding composition is placed. With an 8-inch bonding length and an 8-inch interval between the discrete bonding locations, breaking of but one 8-inch long bond frees not only that length but the adjacent unbonded 8 inches of the drawn cable component.

At the same time, the amount of bonding composition required can be significantly reduced compared to designs that have a continuous presence of bonding composition over the entire length of the cable assembly.

Figure 8:
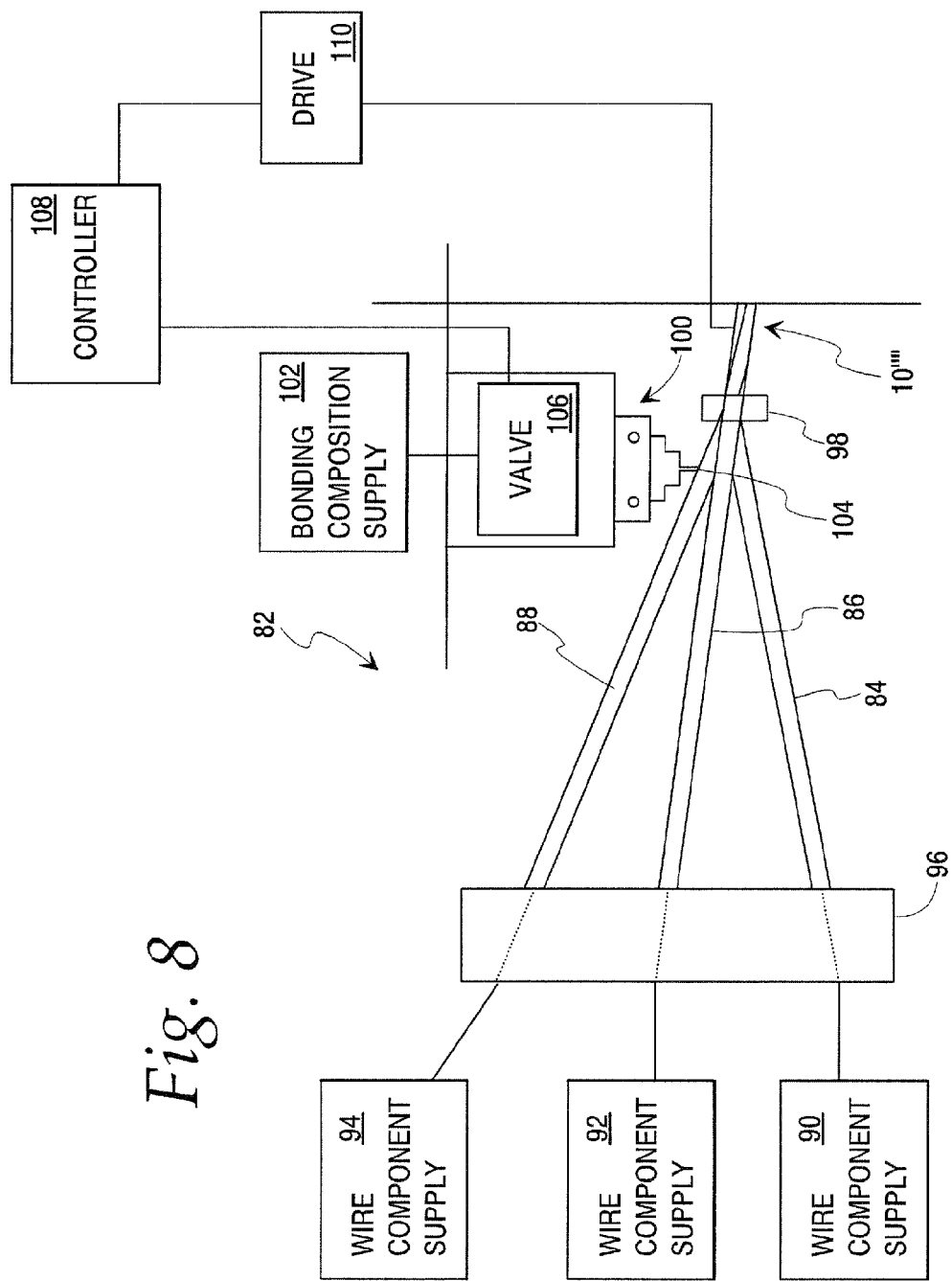
FIG. 8 is a partially schematic representation of an apparatus for forming cable assemblies, according to the invention.

In FIG. 8, a system is shown at 82 for producing a cable assembly 10"", that is intended to be generic to all other variations disclosed herein and those that would be obvious to one skilled in the art. The cable assembly 10"" is shown with three cable components 84, 86, 88, with this number being representative but not limiting.

The cable components 84, 86, 88 are delivered to the apparatus 82 successively from supplies 90, 92, 94 and advanced together at a selected speed.

The cable components 84, 86, 88 are directed through a breaker plate 96 and into a closing die 98.

Upstream of the closing die 98, an extruder 100 dispenses bonding composition from a supply 102 thereof. The bonding composition is ejected through a nozzle 104 strategically against the advancing cable components 84, 86, 88 for bonding in the alternative fashions as described above. The closing die 98 maintains the cable components 84, 86, 88 with the bonding composition thereagainst to create the bond. The cable components 84, 86, 88 come out of the closing die 98 twisted together about their lengths.

The bonding composition from the supply 102 is delivered to the nozzle 104 through a valve 106. A controller 108 dictates operation of the valve 106 to cause discharge of bonding composition at regular, controlled intervals. The controller 108 coordinates this discharge with the rate of advancement of the cable components 84, 86, 88, that is effected through a drive 110. The controller 108 dictates not only the time between successive discharges by the valve 106, but also determines the length of time that discharge occurs. By coordinating the discharge through the valve 106 and the speed of the drive 110, a system operator can set the intervals between discharges and length of discharge to produce the desired application length for the bonding composition as the cable components 84, 86, 88 are advanced. A shorter application cycle with a faster moving cable assembly will yield a shorter length of application of the bonding composition. On the other hand, a slower linear advance of the cable assembly 10"" will cause the application of a longer length of the bonding composition between intervals at the discrete locations at which the bonding composition is applied.

The foregoing disclosure of specific embodiments is intended to be illustrative of the broad concepts comprehended by the invention.

The invention claimed is:

1. A method of forming a cable assembly, the method comprising the steps of:
   obtaining a pre-formed first cable component having a length and comprising at least a first conductive element extending in a lengthwise direction;
   obtaining a pre-formed a second cable component having a length and comprising at least a second conductive component extending in a lengthwise direction;
   applying a bonding composition to the pre-formed first and second cable components at discrete locations at controlled spaced intervals along the lengths of the first and second cable components to thereby maintain a first length of the first and second cable components together with a bonding force that can be overcome by drawing one of the first and second cable components away from the other of the first and second cable components with a force having a component that is transverse to the length of the first and second cable components,
   wherein the discrete locations are spaced lengthwise of the cable assembly distances from 2-8 inches; and packaging a final length of the first and second cable components including the first length for delivery to an end user with the final length in a completed form wherein the first and second cable components are maintained together such that the bonding composition at the discrete locations is the only bonding composition maintaining the first and second cable components together along the first length so that an end user can separate different lengths of the first and second cable components from each other over the first length by breaking only the bond produced by the bonding component at one or more of the discrete locations.

2. The method of forming a cable assembly according to claim 1 wherein the first and second cable components are bonded at the discrete locations by using an adhesive as the composition that bonds separately to each of the first and second cable components.

3. The method of forming a cable assembly according to claim 2 wherein the first cable component has a first jacket formed around the at least first conductive element, the second cable component has a second jacket formed around the at least second conductive element and the adhesive is formed as a layer between the first and second jackets that bonds separately to each of the first and second jackets.

4. The method of forming a cable assembly according to claim 3 wherein the first and second jackets and adhesive are made from the same material.

5. The method of forming a cable assembly according to claim 3 wherein the first and second jackets comprise at least one of polyethylene (PE) and polyvinyl chloride (PVC).

6. The method of forming a cable assembly according to claim 4 wherein the first and second jackets comprise at least one of polyethylene (PE) and polyvinyl chloride (PVC).

7. The method of forming a cable assembly according to claim 1 wherein the first and second cable components are bonded by using a solvent as the composition that causes the first and second cable components to be bonded by being fused with each other.

8. The method of forming a cable assembly according to claim 7 wherein the first cable component has a first jacket formed around the at least first conductive element, the second cable component has a second jacket formed around the at least second conductive element and the solvent melts the first and second jackets to cause the first and second cable components to be bonded by being fused with each other.

9. The method of forming a cable assembly according to claim 7 wherein the solvent comprises tetrahydrofuron (THF).

10. The method of forming a cable assembly according to claim 1 wherein the discrete locations are spaced at regular intervals along the first length of the cable assembly.

11. The method of forming a cable assembly according to claim 1 wherein the first and second cable components are bonded at the discrete locations over distances of 2-8 inches along the entire final length of the cable assembly.

12. The method of forming a cable assembly according to claim 1 wherein the cable assembly further comprises a third cable component having a length and comprising at least a third conductive element extending in a lengthwise direction and the first, second, and third cable components are releasably bonded together at the discrete locations.

13. The method of forming a cable assembly according to claim 12 wherein the composition comprises an adhesive layer that resides between and bonds directly to each of the first, second, and third cable components.

14. The method of forming a cable assembly according to claim 12 wherein the cable assembly further comprises a fourth cable component having a length and comprising at least a fourth conductive element extending in a lengthwise direction and the first cable component is not directly bonded to at least one other of the second, third, and fourth cable components.

15. The method of forming a cable assembly according to claim 1 wherein the first and second cable components are twisted together about their lengths.

16. The method of forming a cable assembly according to claim 1 wherein the bond between the first and second cable components is broken by drawing the one of the first and second cable components away from the other of the first and second cable components with a force between 2-6 pounds.

17. The method of forming a cable assembly according to claim 1 wherein the bonding composition is an adhesive that is applied in a hot melt form to the first and second cable components.

18. The method of forming a cable assembly according to claim 1 wherein the cable assembly has a length and a substantially cylindrical shape that is substantially circular as viewed transversely to the length of the cable assembly.

19. The method of forming a cable assembly according to claim 1 wherein the first and second cable components each has a central axis and the first and second cable components are bonded at locations on the first and second cable components where a line extending through the central axes coincides with the first and second cable components.

20. The method of forming a cable assembly according to claim 1 further comprising the step of drawing the first and second cable components, one away from the other, at multiple discrete locations along at least a portion of the first length with the final length in the completed form to thereby allow use of a desired length of one of the first and second cable components spaced from the other of the first and second cable components.

21. The method of forming a cable assembly according to claim 1 wherein the step of packaging the final length comprises reconfiguring the final length in the completed form by one of coiling or wrapping the final length in the completed form.

22. A method of forming a cable assembly, the method comprising the steps of:
obtaining a pre-formed first cable component having a length and comprising at least a first conductive element extending in a lengthwise direction;
obtaining a pre-formed a second cable component having a length and comprising at least a second conductive component extending in a lengthwise direction;
applying a bonding composition to the pre-formed first and second cable components at discrete locations at controlled, spaced intervals along the lengths of the first and second cable components to thereby maintain a first length of the first and second cable components together with a bonding force that can be overcome by drawing one of the first and second cable components away from the other of the first and second cable components with a force having a component that is transverse to the length of the first and second cable components,
wherein the bonding composition is an adhesive that is applied in a hot melt form to the first and second cable components; and
packaging a final length of the first and second cable components including the first length for delivery to an end user with the final length in a completed form wherein the first and second cable components are maintained together such that the bonding composition at the discrete locations is the only bonding composition maintaining the first and second cable components together along the first length so that an end user can separate different lengths of the first and second cable components from each other over the first length by breaking only the bond produced by the bonding component at one or more of the discrete locations.

23. The method of forming a cable assembly according to claim 22 wherein the bonding force can be overcome by drawing the one of the first and second wire components away from the other of the first and second components with a force of from 2-6 pounds.

* * * * *